United States Patent [19]

Holdeman

[11] 4,347,762
[45] Sep. 7, 1982

[54] PLANETARY GEAR ASSEMBLY

[75] Inventor: John W. Holdeman, Muncie, Ind.

[73] Assignee: Borg-Warner Corporation, Chicago, Ill.

[21] Appl. No.: 155,243

[22] Filed: Jun. 2, 1980

Related U.S. Application Data

[63] Continuation of Ser. No. 937,342, Aug. 28, 1978, abandoned.

[51] Int. Cl.³ .......................... F16H 3/44; F16H 57/10
[52] U.S. Cl. ................................. 74/788; 74/750 R; 74/785
[58] Field of Search .................. 74/750 R, 788, 785, 74/786, 765

[56] References Cited

U.S. PATENT DOCUMENTS

| | | | |
|---|---|---|---|
| 1,413,943 | 4/1922 | Snyder | 74/785 |
| 1,509,498 | 9/1924 | Starr | 74/765 |
| 1,514,872 | 11/1924 | Sturr | 74/785 |
| 1,611,630 | 12/1926 | Burke | 74/750 R |
| 1,795,981 | 3/1931 | Ward | 74/765 |
| 1,998,891 | 4/1935 | Benson | 74/750 R |
| 2,194,823 | 3/1940 | Dooley | 74/750 R |
| 2,331,684 | 10/1943 | Henningsen | 74/785 |
| 2,592,910 | 4/1952 | Keller | 74/752 E X |
| 2,601,151 | 6/1952 | Keller | 74/752 E |
| 2,787,919 | 4/1957 | Senkowski et al. | 74/740 X |
| 2,939,343 | 6/1960 | Berklege | 74/785 X |
| 3,477,314 | 11/1969 | Rutkowski | 74/750 R |
| 4,063,470 | 12/1977 | Kelbel | 74/785 |
| 4,074,591 | 2/1978 | Dick | 74/785 |
| 4,103,753 | 8/1978 | Holdeman | 74/785 |
| 4,189,960 | 2/1980 | Holdeman | 74/750 R X |

FOREIGN PATENT DOCUMENTS

| | | | |
|---|---|---|---|
| 529737 | 8/1956 | Canada | 74/750 R |
| 2507799 | 8/1975 | Fed. Rep. of Germany | 74/750 R |
| 375986 | 7/1907 | France | 74/785 |

Primary Examiner—Leslie Braun
Attorney, Agent, or Firm—Julian Schachner

[57] ABSTRACT

A planetary gear assembly may be shifted manually between a neutral position and high and low range position for establishing direct drive and reduction ratio drive modes. The assembly is shiftable as an integral unit, and requires only one mesh point when shifting to either of the high or low range positions. The ring and planet gears are unloaded in the direct drive mode, thus avoiding vibration and wear commonly experienced when running locked up.

16 Claims, 5 Drawing Figures

PLANETARY GEAR ASSEMBLY

This is a continuation of application Ser. No. 937,342 filed Aug. 28, 1978, now abandoned.

BACKGROUND OF THE INVENTION

This invention relates generally to a power transfer mechanism. More particularly it relates to a planetary gear assembly which may be shifted manually between a neutral position, a high range position wherein direct drive is established, and a low range position wherein reduction ratio drive is established.

In recent years there have been many improvements in drive trains, including improvements related to planetary gearing for establishing paths for the transfer of power. Some such planetary gear sets are shifted by engaging and disengaging friction elements manually, hydraulically, electrically or by some other suitable means. Other planetary gear sets are shifted by engaging and disengaging clutches. Normally this is done by sliding sleeves into and out of dental engagement with various elements for establishing high and low range modes. This requires considerable space and a large number of parts within the assembly. It has an important disadvantage in that more than one mesh point may be required for shifting. Further, in these arrangements the system is generally loaded when running in the locked up condition, causing vibration and excessive wear.

There remains a need for a planetary gear assembly which may be shifted simply between the various operating positions, which incorporates a minimum of parts and a minimum of mesh points, and which is not loaded when running locked up. There is a further need for such an assembly which is susceptible of economical manufacture and efficient operation.

SUMMARY OF THE INVENTION

This invention is directed to a planetary gear assembly which will meet the needs noted above. The assembly does not require its own housing, but rather incorporates a slidable carrier with which all other elements of the assembly are slidable. The assembly includes a planet carrier, a sun gear, and a ring gear which slide as a unit to provide direct drive through the sun gear, and to provide reduction ratio drive from the sun gear to the planet carrier with the ring gear grounded.

In direct drive, power is transmitted from an input through the sun gear to an output without loading the planet and ring gears, thus avoiding vibratory wear commonly experienced when running locked up. In reduction drive, the assembly is moved to disengage the sun gear from the output and to ground the ring gear by locking it to a stationary member. In neutral, the sun gear is disengaged from the output and the ring gear is disengaged from the stationary member.

Thus the requirements of various manufacturers for a lightweight, economical planetary gear assembly may be easily and simply satisfied, as will be described.

BRIEF DESCRIPTION OF THE DRAWING

The objects and advantages of this invention will become apparent to those skilled in the art upon careful consideration of the specification herein, including the drawing, wherein.

Figure 1:
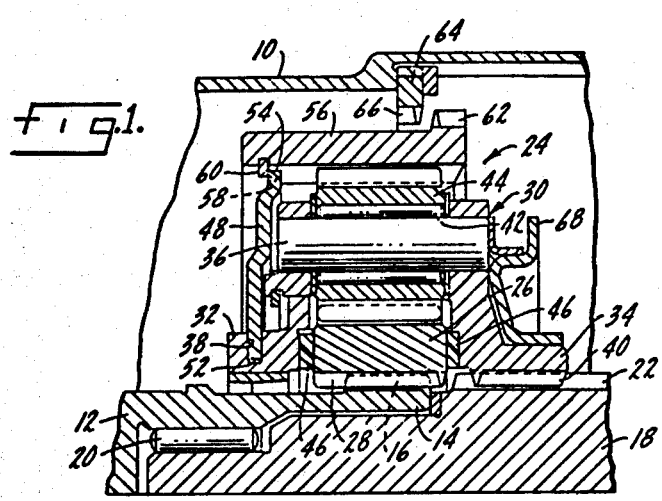
FIG. 1 is a sectional view showing details of the planetary gear assembly in the neutral position.

While this invention is susceptible of embodiment in many different forms, there is shown in the drawing and herein will be described in detail a preferred embodiment. It should be understood that the present disclosure is considered to be an exemplification of the principles of the invention, and is not intended to limit the invention to this embodiment.

DESCRIPTION OF A PREFERRED EMBODIMENT

Referring now to the drawing in greater detail, there is shown a housing 10 which may be, for example, the housing of an automotive transmission or transfer case. An input member in the form of a shaft 12 or the like is journalled in a suitable bearing (not shown) for rotation in housing 10. Input shaft 12 is provided with an annular extension 14. Suitable spline teeth 16 are formed on the outer surface of extension 14.

An output member in the form of a shaft 18 or the like is journalled in a suitable bearing 20 and another bearing (not shown) for rotation in housing 10. Suitable spline teeth 22 are formed on the outer periphery of shaft 18 in alignment with teeth 16 of extension 14.

A planetary gear assembly 24 includes a sun gear 26 defining interior spline teeth 28 continuously engaged with teeth 16 such that sun gear 26 is rotatable with and slidable relative to input shaft 12. As teeth 16 and 22 are in alignment, sun gear 26 is slidable such that teeth 28 are engagable with teeth 22 as well as teeth 16.

Assembly 24 also includes a planet carrier 30. Carrier 30 incorporates a pair of end sections 32 and 34 supporting a plurality of shafts 36, one of which is shown in the drawing, spaced in annular configuration. End section 32 defines an annular, outwardly facing groove 38. End section 34 defines spline teeth 40 continuously engaged with teeth 22 such that carrier 30 is rotatable with and slidable relative to output shaft 18. Each shaft 36 carries a suitable bearing 42 between end sections 32 and 34. Journalled on each bearing 42 is a planet gear 44. Planet gears 44 are in mesh with sun gear 26. Suitable spacers 46 are provided between sun gear 26 and end sections 32 and 34.

A locator element in the form of a plate 48 is carried in groove 38 of end section 32 so as to be slidable with and rotatable relative to end section 32. In one preferred form of the invention, locator plate 48 is in the form of an annulus, having a small segment 50 thereof cut away and a notch 52 formed therein such that locator plate 48 takes a horseshoe configuration. This configuration allows easy insertion of locator plate 48 into groove 38. Suitable keys 54 extend outwardly from the outer surface of plate 48.

A ring gear 56 is in mesh with planet gears 44. Ring gear 56 defines a plurality of keyways 58 complementary to keys 54 of plate 48. A suitable locking ring 60 or the like maintains engagement of keys 54 in keyways 58 such that ring gear 56 and plate 48 are movable together. Ring gear 56 also defines teeth 62 on the outer surface thereof.

An annular element 64 is secured to housing 10. Element 64 defines teeth 66 in alignment with teeth 62 of ring gear 56. It should be understood that element 64 may be formed as an integral part of housing 10 if desired.

A shift element 68 is rigidly secured to carrier 30 and is engagable by a suitable shift fork or the like (not shown) such that carrier 30, sun gear 26 and ring gear 56 may be shifted as a unitary assembly. Element 68 may be formed from one or more stampings or the like suitably secured to carrier 30.

Figure 2:
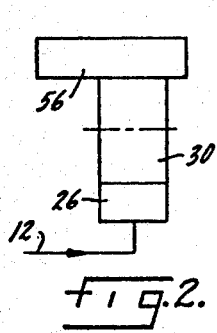
FIG. 2 is a schematic diagram illustrating the planetary gear assembly in the neutral position.

As shown in FIG. 1, planetary gear assembly 24 is in the neutral position. Spline teeth 16 and 28 are engaged, as are spline teeth 40 and 22. Teeth 62 are not engaged with teeth 66. Rotation of input shaft 12 will cause planetary gear assembly 24 to freewheel, and no rotation will be imparted to output shaft 18. This mode is illustrated schematically in FIG. 2.

Figure 3:
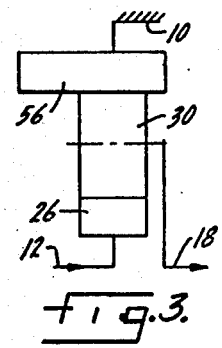
FIG. 3 is a schematic diagram, similar to FIG. 2, illustrating the planetary gear assembly in the low range position providing reduction ratio drive.

Leftward movement of planetary gear assembly 24 from the position shown in FIG. 1 will move teeth 62 into engagement with teeth 66, but will not move spline teeth 40 into engagement with spline teeth 16. Such leftward movement establishes the low range or reduction ratio drive mode illustrated schematically in FIG. 3. Ring gear 56 is grounded by being locked to housing 10. Torque may be transferred from input shaft 12 through sun gear 26, planet gears 44 and planet carrier 30 to output shaft 18. Ring gear 56 serves as a reaction member, and end section 32 slides relative to locator plate 48. Reduction ratio drive is established from input shaft 12 to output shaft 18.

Figure 4:
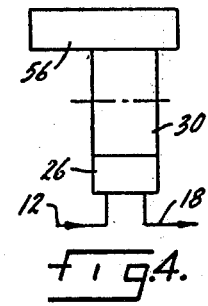
FIG. 4 is a schematic diagram, similar to FIG. 2, illustrating the planetary gear assembly in the high range position providing direct drive.
Figure 5:
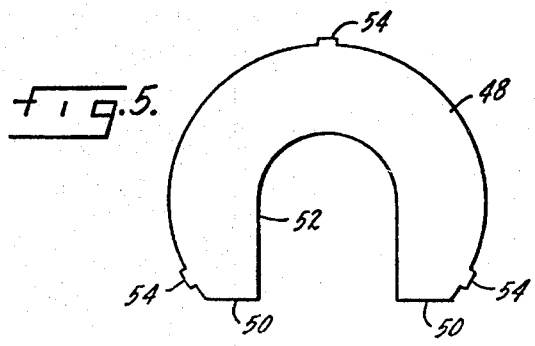
FIG. 5 is an elevational view of the locator plate for the ring gear.

Rightward movement of planetary gear assembly 24 from the position shown in FIG. 1 will move spline teeth 28 into engagement with spline teeth 22. This establishes the high range or direct drive mode illustrated schematically in FIG. 4. Torque may be transferred from input shaft 12 through sun gear 26 to output shaft 18. Ring gear 56 and planet gears 44 are not loaded.

Thus it will be seen that a simple, light, economical planetary gear assembly is slidable as an ingegral unit within the housing of an associated transmission or transfer case. The assembly itself requires no housing. The planet carrier may be shifted so as to shift the entire assembly. When the assembly is shifted from neutral to either the high or low range position, there is only one set of mesh points, thus eliminating any tendency for clashing gears. Specifically, as the assembly is shifted from neutral to the low range position, it is only necessary that teeth 62 move into mesh with teeth 66. Similarly, as the planetary gear assembly is shifted from neutral to the high range position, it is only necessary that spline teeth 28 move into engagement with spline teeth 22.

The assembly uses the sun gear as the input element. Direct drive is established by engaging the sun gear with the output member. Reduction ratio drive is provided by grounding the reaction ring gear and using the carrier as the output element. In direct drive, the ring and planet gears are unloaded.

A suitable locator plate is locked to the ring gear and is supported by the carrier. The locator plate and ring gear thus are shiftable axially as the carrier is shifted axially, and yet are rotatable relative to the carrier as the locator plate slides in a groove defined by the carrier.

It should be obvious that the assembly could be arranged such that power is transferred from shaft 18, as an input member, to shaft 12, as an output member. Of course, such an arrangement would provide neutral, direct drive, and overdrive.

While a preferred embodiment of the invention has been shown and described, this should be considered as illustrative and may be modified by those skilled in the art. It is intended that the claims herein cover all such modifications as may fall within the spirit and scope of the invention.

What is claimed is:

1. In combination, first and second rotatable members, and a planetary gear assembly movable as a unit, said planetary gear assembly comprising sun gear means continuously engaged with said first member, planet carrier means continuously engaged with said second member, ring gear means, and planet gear means supported by said planet carrier means in meshing relationship with said sun and ring gear means, said planetary gear assembly being movable to one position wherein said sun gear means is engaged with said second member and said ring gear means is not grounded, and to another position wherein said sun gear means is not engaged with said second member and said ring gear means is grounded.

2. The invention of claim 1, said planetary gear assembly being movable to a neutral position wherein said sun gear means is not engaged with said second member and said ring gear means is not grounded.

3. The invention of claim 2, said neutral position being between said one and other positions.

4. The invention of claim 1, said first and second members being coaxial, and said planetary gear assembly being axially slidable.

5. The invention of claim 4, said planetary gear assembly being axially slidable to a neutral position wherein said sun gear means is not engaged with said second member and said ring gear means is not grounded.

6. The invention of claim 5, said neutral position being between said one and other positions.

7. The invention of claim 4, said ring gear means including a ring gear and an element secured thereto, said element being supported for axial sliding movement with said planet carrier means and rotational movement relative thereto about said axis.

8. The invention of claim 7, said planet carrier means defining a radially oriented groove, and said element being movably engaged in said groove.

9. The invention of claim 8, said planet carrier means including a pair of spaced end sections and at least one axially oriented carrier shaft supported thereby, and said planet gear means including at least one planet gear supported on said carrier shaft, one of said end sections being continuously engaged with said second member, and one of said end sections defining said groove.

10. The invention of claim 9, said element including a horseshoe-shaped plate secured to said ring gear, said plate being slidably received in said groove.

11. The invention of claims 9 or 10, said sun gear means being oriented between said end sections.

12. In combination, first and second rotatable members, and a planetary gear assembly slidable as a unit, said planetary gear assembly comprising sun gear means continuously engaged with said first member, planet carrier means continuously engaged with said second member, a ring gear, and at least one planet gear in meshing relationship with said sun gear means and said ring gear, said planetary gear assembly being slidable as a unit to one position wherein one of said means is engaged with both of said members and said ring gear is not grounded, and to another position wherein said one means is not engaged with both of said members and said ring gear is grounded.

13. The invention of claim 12, said planetary gear assembly being slidable as a unit to a neutral position wherein said one means is not engaged with both of said members and said ring gear is not grounded.

14. The invention of claim 13, said ring gear including an element secured thereto, said element being supported for sliding movement with said planet carrier means and rotational movement relative thereto.

15. The invention of claim 14, said planet carrier means including a pair of spaced end sections straddling said sun gear means, and at least one carrier shaft, said planet gear being supported on said carrier shaft, one of said end sections being continuously engaged with said second member, one of said end sections defining a radially oriented groove, and said element being movably engaged in said groove.

16. The invention of claim 15, said element including a horseshoe-shaped plate secured to said ring gear, said plate being slidably received in said groove.

* * * * *